July 18, 1939.  R. C. LEGAT  2,166,816
BUMPER GUARD
Filed March 14, 1936

INVENTOR
ROBERT C. LEGAT.
BY
Harness, Dind, Pater & Harris
ATTORNEY

Patented July 18, 1939

2,166,816

UNITED STATES PATENT OFFICE 2,166,816

BUMPER GUARD

Robert C. Legat, New Britain, Conn.

Application March 14, 1936, Serial No. 68,810

3 Claims. (Cl. 293—55)

This invention relates to a bumper for an automotive vehicle and more particularly to improvements of guards therefor of the character which will increase the vertical range of the bumper.

An object of the invention is to provide an improved bumper guard which under normal conditions will resist inter-engagement of opposing bumpers or guards but which will yield to permit disengagement thereof.

Considerable difficulty has been encountered with bumpers equipped with entirely fixed guards in that they become engaged with the bumper or guards of another vehicle and as a result considerable time and effort is required to effect disengagement. In many instances completely rigid guards engage the roadway surface when the vehicle is disposed at a rather sharply inclined angle, frequently resulting in damage both to the guard and bumper.

With the above difficulties in mind a further object of the invention is to provide an improved guard that will rotate in one direction relative to the bumper and which is retained against rotation in the opposite direction, and more particularly, to provide a guard that will rotate in a direction away from the vehicle but which is firmly held against rotative movement in a direction toward the vehicle.

Another object of the invention is the provision of improved means for mounting a plurality of guard elements on a bumper.

Other objects and advantages of the invention will be more apparent from the following description taken in connection with the accompanying drawing, in which.

Figures 2, 3:
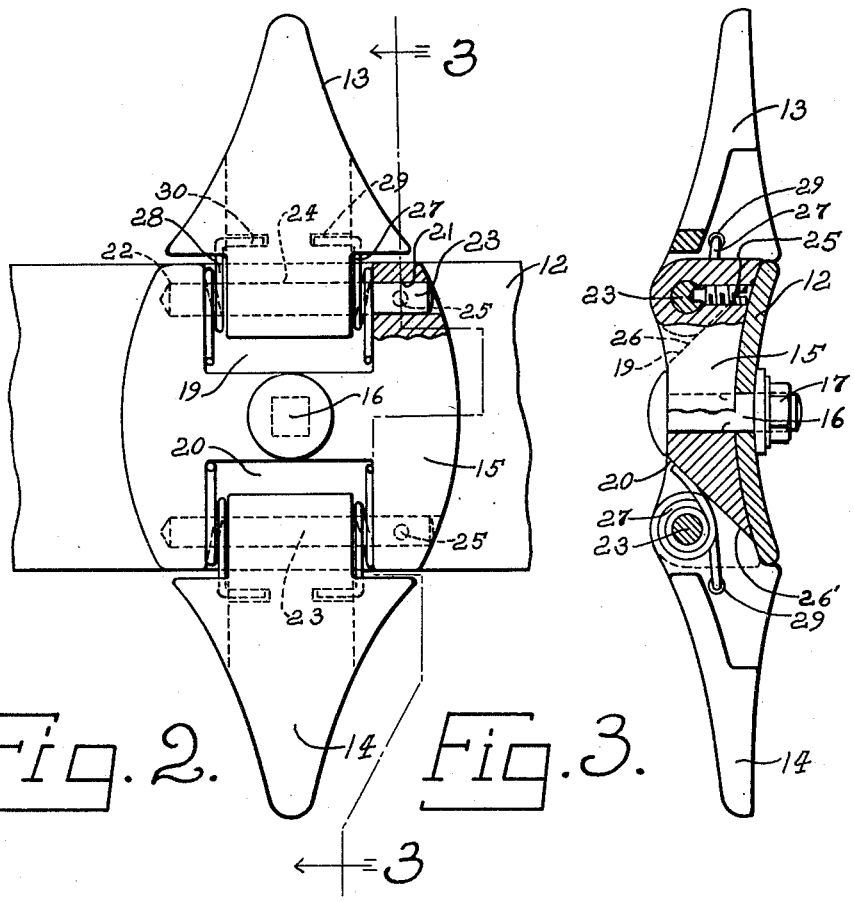
Fig. 2 is a fragmentary side elevational view, partly in section, of a bumper having my improved guard mounted thereon.
Fig. 3 is a side elevational view, partly in section, of the bumper and guard shown in Fig. 2.

Referring to the drawing, I have shown the front portion of a vehicle 10 having forwardly projecting arms 11 to which is attached a transversely extending bumper 12. As a means for increasing the effective vertical range of the bumper, the latter is equipped with detachable guards, each including a pair of guard elements generally designated by the numbers 13 and 14, such guard elements being preferably arranged in pairs and projecting beyond the respective longitudinal edges of the bumper. The guards may be positioned at suitable locations on the bumper but they are preferably arranged adjacent the respective end portions thereof.

Each guard also includes a mounting member 15 secured to the bumper 12 by a bolt 16 having a threaded end portion on the inner side of the bumper when the latter is assembled on the vehicle. A nut 17 is threaded on the inner end of the bolt 16 for retaining the assembly in position. The mounting member 15 has oppositely inclined faces 19 and 20, each provided with spaced side walls respectively. The faces 19 and 20 are adapted to contact the oppositely inclined faces 26 and 26' of the guard elements 13 and 14, respectively. Inasmuch as the construction and mounting of the guard elements 13 and 14 are identical, it is deemed necessary to describe only one in particular.

The spaced walls adjacent opposite extremities of the inclined face 19 are provided with aligned openings 21 and 22 for receiving a hinge pin 23 extending through an aperture 24 in the adjacent end portion of the guard element 13. The pin 23 is retained in position by a set screw 25 threaded into an opening in the mounting member 15. The guard element 13 has an inclined face 26 which, when assembled as illustrated in Fig. 3, engages the inclined face 19 of the member 15, thereby retaining the guard element against rotation in a direction to the right, as illustrated in Fig. 3, and toward the vehicle when the bumper and guard are assembled thereto. The guard element 13 is urged to its normal position, illustrated in Figs. 2 and 3, by springs 27 and 28 disposed between the adjacent face of the guard element and the side walls of the inclined face 19, respectively. The springs 27 and 28 have coils encircling the pin 23 and have adjacent end portions bearing against the face 19, the opposite ends of these springs being bent inwardly with each other and disposed in apertures 29 and 30 respectively in the guard 13.

Figure 1:
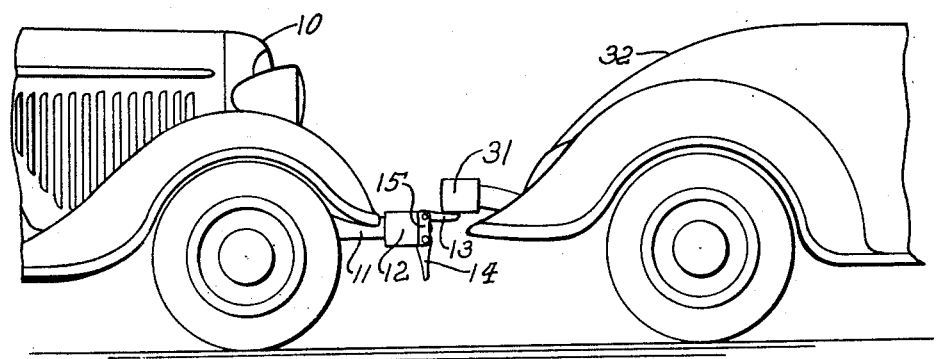
Fig. 1 is a fragmentary side elevational view illustrating a vehicle equipped with a bumper and the improved guard, the latter being shown in position for releasing inter-locked bumpers.

In Fig. 1 I have illustrated the guard 13 in a position to which it has been rotated by application of a forwardly directed force due to the bumper 31 of the vehicle 32 having become interlocked with the bumper 12 and guard element 13. The latter will be returned to its normal position, as illustrated in Figs. 2 and 3, by the springs 27 and 28 upon disengagement from the bumper 31.

It will be understood that the vehicle 10 may be equipped at the rear with bumper and guards constructed and arranged to operate in the manner set forth in connection with the bumper 12 and guard elements 13 and 14.

I claim:

1. A bumper for automobiles comprising, in combination, a main transverse bumper member and a mounting member carried thereby having a pair of guideways adjacent a respective opposite edge portion thereof, each of said guideways including oppositely disposed side walls and an intermediate face, said faces being inclined from the vertical, a pair of auxiliary vertically disposed guards each extending beyond a longitudinal edge of said bumper member, means for rotatably supporting each of said guards on said mounting member including a hinge pin extending into the side walls of a respective guideway, each of said guards having an inclined face engaging the face of the adjacent guideway for resisting rotary movement of the guard in one direction, the engaging faces of said mounting member and one of said guards being oppositely inclined with respect to the engaging faces of the other of said guards and said mounting member, and individual means yieldably accommodating rotary movement of each of said guards in the opposite direction.

2. A bumper for automobiles comprising, in combination, a main transverse bumper member and a mounting member carried thereby, said mounting member having a notch therein having opposite side walls and an intermediate face, a vertically disposed auxiliary guard extending substantially beyond the main bumper member, means for rotatably supporting said guard on said mounting member including a hinge pin extending into the side walls of said notch, said guard having a face cooperating with the face of said notch for retaining said guard against rotation in one direction, and means yieldably accommodating rotation of said guard in the opposite direction.

3. A bumper for automobiles comprising, in combination, a main transverse bumper member and a mounting member carried thereby, said mounting member having a notch therein having opposite side walls and an intermediate face, an auxiliary bumper portion extending substantially beyond the main bumper member, means for rotatably supporting said auxiliary bumper portion on said mounting member including a hinge pin extending into the side walls of said notch, said auxiliary bumper portion having an inclined face engaging the inclined face of said notch for retaining said bumper portion against rotation in one direction, and means yieldably accommodating rotation of said bumper portion in the opposite direction.

ROBERT C. LEGAT.